(12) United States Patent  (10) Patent No.: US 8,928,568 B2
Chiang et al.  (45) Date of Patent: Jan. 6, 2015

(54) SUB-PIXEL VOLTAGE CONTROL USING COUPLING CAPACITORS

(75) Inventors: Chia-Lun Chiang, Hsin-Chu (TW);
Yu-Sheng Huang, Hsin-Chu (TW);
Yan-Ciao Chen, Hsin-Chu (TW);
Meng-Ju Tsai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 231 days.

(21) Appl. No.: 13/446,477

(22) Filed: Apr. 13, 2012

(65) Prior Publication Data

US 2013/0128166 A1 May 23, 2013

(30) Foreign Application Priority Data

Nov. 18, 2011 (TW) .............................. 100142367 A

(51) Int. Cl.
*G09G 3/36* (2006.01)
*G02F 1/1362* (2006.01)

(52) U.S. Cl.
CPC ............ *G09G 3/3659* (2013.01); *G02F 1/1362* (2013.01); *G09G 2300/0426* (2013.01); *G09G 2300/0447* (2013.01); *G09G 2300/0852* (2013.01); *G02F 1/136213* (2013.01); *G02F 1/13624* (2013.01)
USPC ............................................. 345/87; 345/88

(58) Field of Classification Search
USPC ................................... 345/87–104
See application file for complete search history.

(56) References Cited

U.S. PATENT DOCUMENTS

| | | | | |
|---|---|---|---|---|
| 8,619,011 | B2* | 12/2013 | Kimura | 345/90 |
| 2008/0055292 | A1* | 3/2008 | Do et al. | 345/204 |
| 2008/0122770 | A1* | 5/2008 | Huang et al. | 345/87 |
| 2008/0278424 | A1* | 11/2008 | Kim et al. | 345/92 |
| 2008/0303768 | A1* | 12/2008 | Do et al. | 345/90 |
| 2008/0309600 | A1* | 12/2008 | Lee et al. | 345/89 |
| 2009/0009458 | A1* | 1/2009 | Bae et al. | 345/92 |
| 2009/0146936 | A1* | 6/2009 | Ueda et al. | 345/87 |
| 2009/0174639 | A1* | 7/2009 | Chung et al. | 345/88 |
| 2009/0295693 | A1* | 12/2009 | Yeom et al. | 345/88 |
| 2010/0001940 | A1* | 1/2010 | Lee et al. | 345/90 |
| 2010/0007594 | A1* | 1/2010 | Lai et al. | 345/98 |
| 2011/0156993 | A1* | 6/2011 | Ting et al. | 345/87 |
| 2012/0001839 | A1* | 1/2012 | Tsubata | 345/90 |

* cited by examiner

*Primary Examiner* — Alexander Eisen
*Assistant Examiner* — Nelson Lam
(74) *Attorney, Agent, or Firm* — WPAT, PC; Justin King

(57) ABSTRACT

A pixel includes sub-pixels each of which includes a first display region, a second display region, a third display region, a first capacitor, and a second capacitor. The first capacitor connects the second display region with the third display region. The second capacitor connects the first display region to the third display region via a switch. When the switch is activated, the potential of the third display region is decreased via the second capacitor, the potential of the first display region is increased via the second capacitor, and the potential of the second display region is decreased via the first capacitor. A display panel and driving method in a display panel are also disclosed herein.

19 Claims, 9 Drawing Sheets

SUB-PIXEL VOLTAGE CONTROL USING COUPLING CAPACITORS

RELATED APPLICATIONS

This application claims priority to Taiwan Patent Application Serial Number 100142367, filed Nov. 18, 2011, which is herein incorporated by reference.

BACKGROUND

1. Technical Field

The present disclosure relates to a display device. More particularly, the present disclosure relates to a pixel in a display device.

2. Description of Related Art

Liquid crystal display (LCD) has been widely used as a display device because it has advantages such as displaying images with good quality, little power consumption, etc.

For a current LCD, a multi-domain vertical alignment (MVA) technique has been commonly used in a panel therein, such that the LCD with wide viewing angles can be made. However, the MVA technique is disadvantageous in that the display has a problem of color shift or color washout when a viewing angle of a user viewing the display is changed.

For solving the aforementioned problem, in a conventional skill, each pixel unit is divided into several display regions, and the display regions are arranged to receive signals on data lines and thus have corresponding potentials. When a scan line is driven, the potential of one of two display regions is used to push up the potential of the other of two display regions, such that the potentials of the aforementioned display regions are different from each other, and each display region has a corresponding pixel voltage so as to display a corresponding color image which corresponds with image data more precisely, thus solving the problem of color shift.

However, based on practical applications and simulation results, the aforementioned conventional skill of merely using the potential of one display region to increase the potential of the other display region still cannot significantly enlarge the potential difference between the display regions, and thus the difference between the pixel voltages possessed by the display regions remains quite small, such that images displayed by different display regions cannot be distinguished clearly from each other, and the problem of color shift cannot be solved effectively.

SUMMARY

An aspect of the present invention is related to a pixel. The pixel includes a plurality of sub-pixels. Each of the sub-pixels includes a first display region, a second display region, a third display region, a first capacitor, and a second capacitor. The first display region, the second display region and the third display region are configured to receive a data signal on a same data line to have potentials, respectively. The first capacitor is electrically connected to the second display region and the third display region. The second capacitor is electrically connected to the first display region and the third display region through a switch, in which the switch is configured to be activated in response to a scan signal. When the switch is activated, the potential of the third display region is decreased via the second capacitor, the potential of the first display region is increased via the second capacitor, and the potential of the second display region is decreased via the first capacitor.

Another aspect of the present invention relates to a display panel. The display panel includes a plurality of data lines, a plurality of scan lines, and a plurality of sub-pixels. The scan lines cross the data lines to define a plurality of sub-pixel regions. The sub-pixels are disposed in the sub-pixel regions, and each of the sub-pixels includes a first sub-pixel electrode, a second sub-pixel electrode, a third sub-pixel electrode, a coupling capacitor, and a first charge-sharing capacitor. The first sub-pixel electrode is electrically connected to a data line of the data lines through a first switch. The second sub-pixel electrode is electrically connected to the data line through a second switch. The third sub-pixel electrode is electrically connected to the data line through a third switch. The coupling capacitor is electrically connected between the second sub-pixel electrode and the third sub-pixel electrode. The first charge-sharing capacitor has a first end electrically connected to the first sub-pixel electrode, and a second end electrically connected to the third sub-pixel electrode through a fourth switch.

Yet another aspect of the present invention relates to a driving method for use in a display panel. The display panel includes a plurality of data lines, a plurality of scan lines and a plurality of sub-pixels. The scan lines cross the data lines to define a plurality of sub-pixel regions. The sub-pixels are disposed in the sub-pixel regions. Each of the sub-pixels includes a first sub-pixel electrode, a second sub-pixel electrode, a third sub-pixel electrode, a coupling capacitor, and a first charge-sharing capacitor. The coupling capacitor is electrically connected between the second sub-pixel electrode and the third sub-pixel electrode. The first charge-sharing capacitor is electrically connected between the first sub-pixel electrode and the third sub-pixel electrode. The driving method includes the following steps. A data signal is transmitted through a same data line of the data lines to the first sub-pixel electrode, the second sub-pixel electrode and the third sub-pixel electrode. A potential of the third sub-pixel electrode is pulled down and a potential of the first sub-pixel electrode is pulled up via the first charge-sharing capacitor in a positive half period. When the potential of the third sub-pixel electrode is pulled down in the positive half period, a potential of the second sub-pixel electrode is pulled down via the coupling capacitor.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows.

DESCRIPTION OF THE EMBODIMENTS

In the following description, specific details are presented to provide a thorough understanding of the embodiments of the present invention. Persons of ordinary skill in the relevant art will recognize, however, that the present invention can be practiced without one or more of the specific details, or in combination with other components. Well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may not be in direct contact with each other. "Coupled" may still be used to indicate that two or more elements cooperate or interact with each other.

Figure 1:
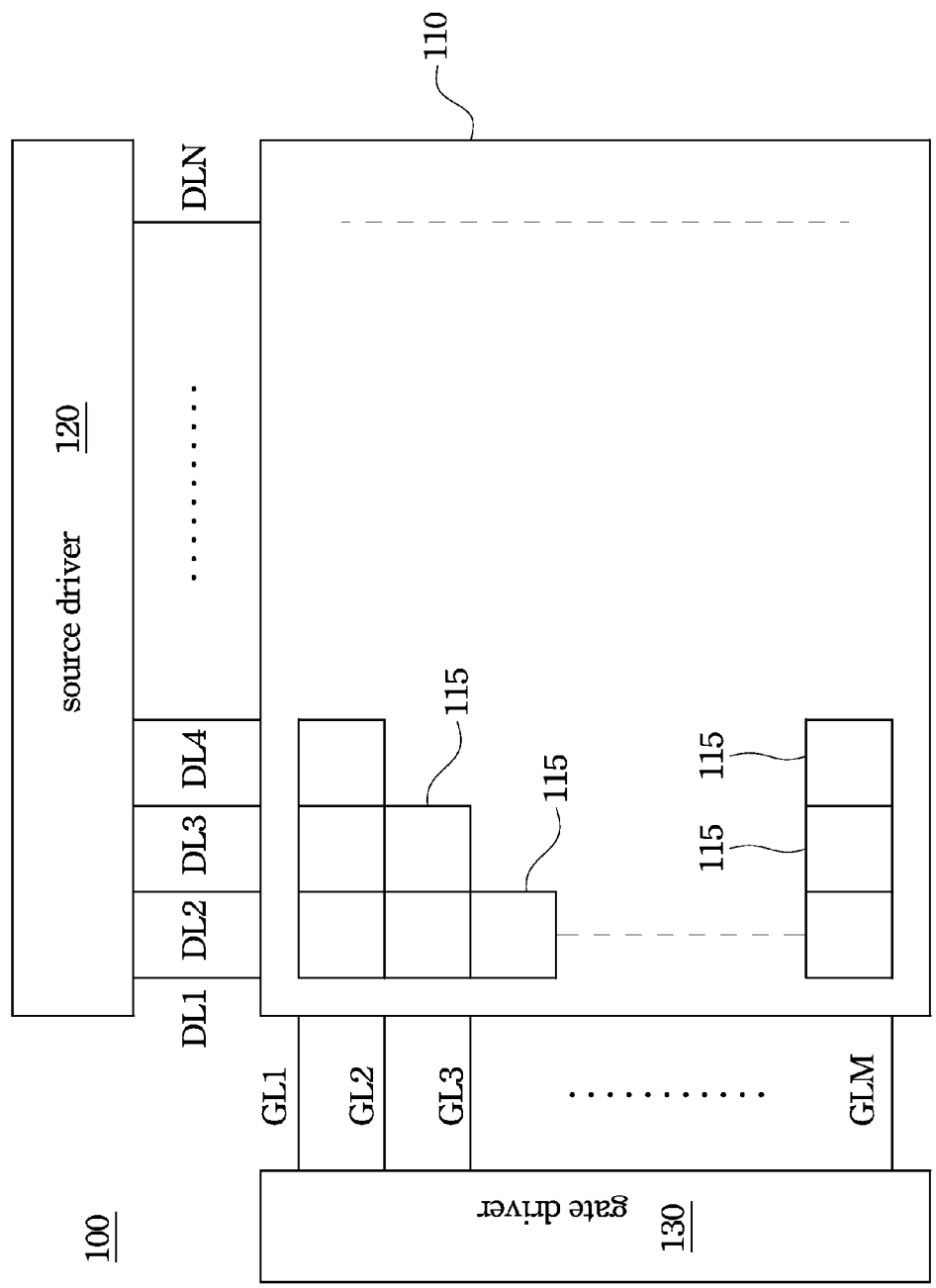
FIG. 1 is a diagram illustrating a display panel according to one embodiment of the present invention.

FIG. 1 is a diagram illustrating a display panel according to one embodiment of the present invention. The display panel 100 includes an image display region 110, a source driver 120 and a scan driver 130. The image display region 110 includes an array formed from a plurality of data lines (e.g., N data lines DL1-DLN, where N is a positive integer) cross a plurality of scan lines (e.g., M scan lines GL1-GLM, where M is a positive integer), and a number of pixels 115, in which the pixels 115 are disposed in the array. The source driver 120 is coupled to the data lines DL1-DLN and configured to provide data signals which are transmitted through the data lines DL1-DLN to the image display region 110. The scan driver 130 is coupled to the scan lines GL1-GLM and is configured to provide scan signals which are transmitted through the scan lines GL1-GLM to the image display region 110.

Figure 2:
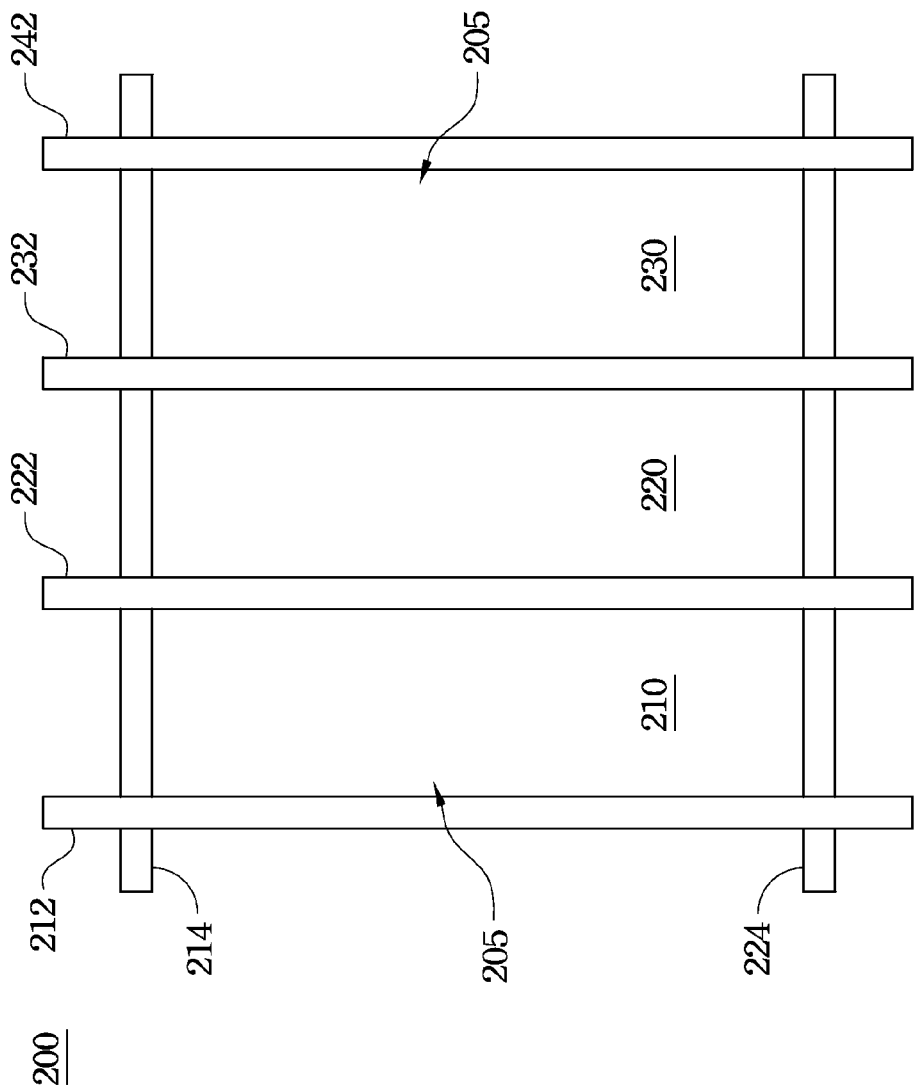
FIG. 2 is a diagram illustrating a pixel according to one embodiment of the present invention.

FIG. 2 is a diagram illustrating a pixel according to one embodiment of the present invention. The pixel 200 can be applied in the display panel 100 shown in FIG. 1. As shown in FIG. 2, the data lines 212, 222, 232, 242 cross the scan lines 214, 224 to define a plurality of sub-pixel regions 205, and the pixel 200 includes sub-pixels 210, 220, 230, in which the sub-pixels 210, 220, 230 are disposed in the sub-pixel regions 205, respectively.

In one embodiment, the sub-pixels 210, 220, 230 may be different color sub-pixels, such as a red (R) sub-pixel, a green (G) sub-pixel, and a blue (B) sub-pixel, respectively. The data line 212 can be configured to transmit the data signal to the red sub-pixels in the same column, the data line 222 can be configured to transmit the data signal to the green sub-pixels in the same column, the data line 232 can be configured to transmit the data signal to the blue sub-pixels in the same column, and the data line 242 can be configured to transmit the data signal to the red sub-pixels in the next column. Furthermore, the scan line 214 can be configured to transmit the scan signal to the sub-pixels in the same row, and the scan line 224 can be configured to transmit the scan signal to the sub-pixels in the next row.

Figure 3:
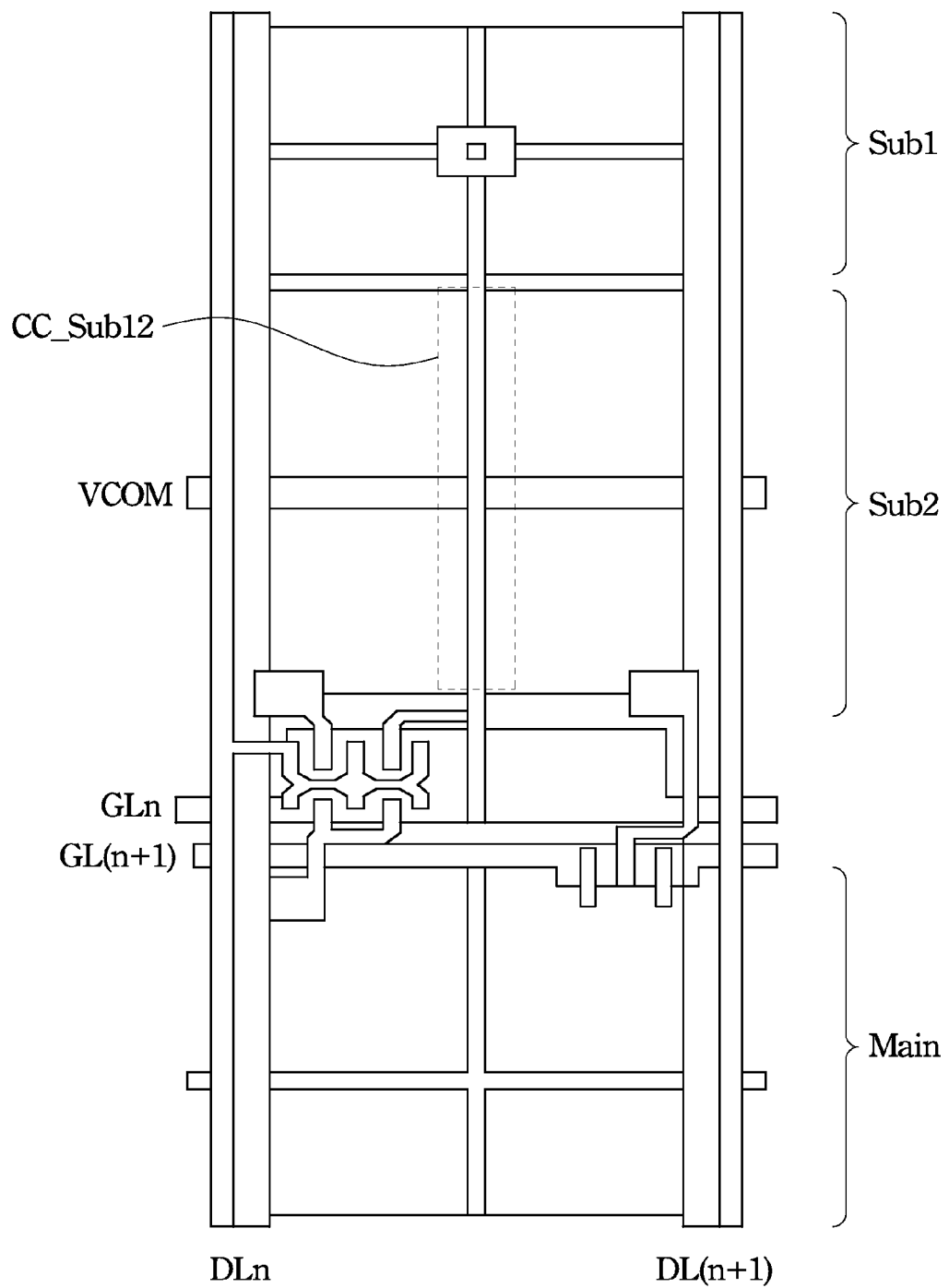
FIG. 3 is a diagram illustrating a sub-pixel according to one embodiment of the present invention.

FIG. 3 is a diagram illustrating a sub-pixel according to one embodiment of the present invention. The sub-pixel 300 is applicable to the pixel 200 shown in FIG. 2. As shown in FIG. 3, the sub-pixel 300 includes a first display region Main, a second display region Sub1, and a third display region Sub2, in which each display region also has multiple domains. The first display region Main, the second display region Sub1 and the third display region Sub2 are configured to receive a data signal on a same data line (e.g., the data line DLn) to have potentials, respectively, so as to display corresponding images separately.

Figure 4:
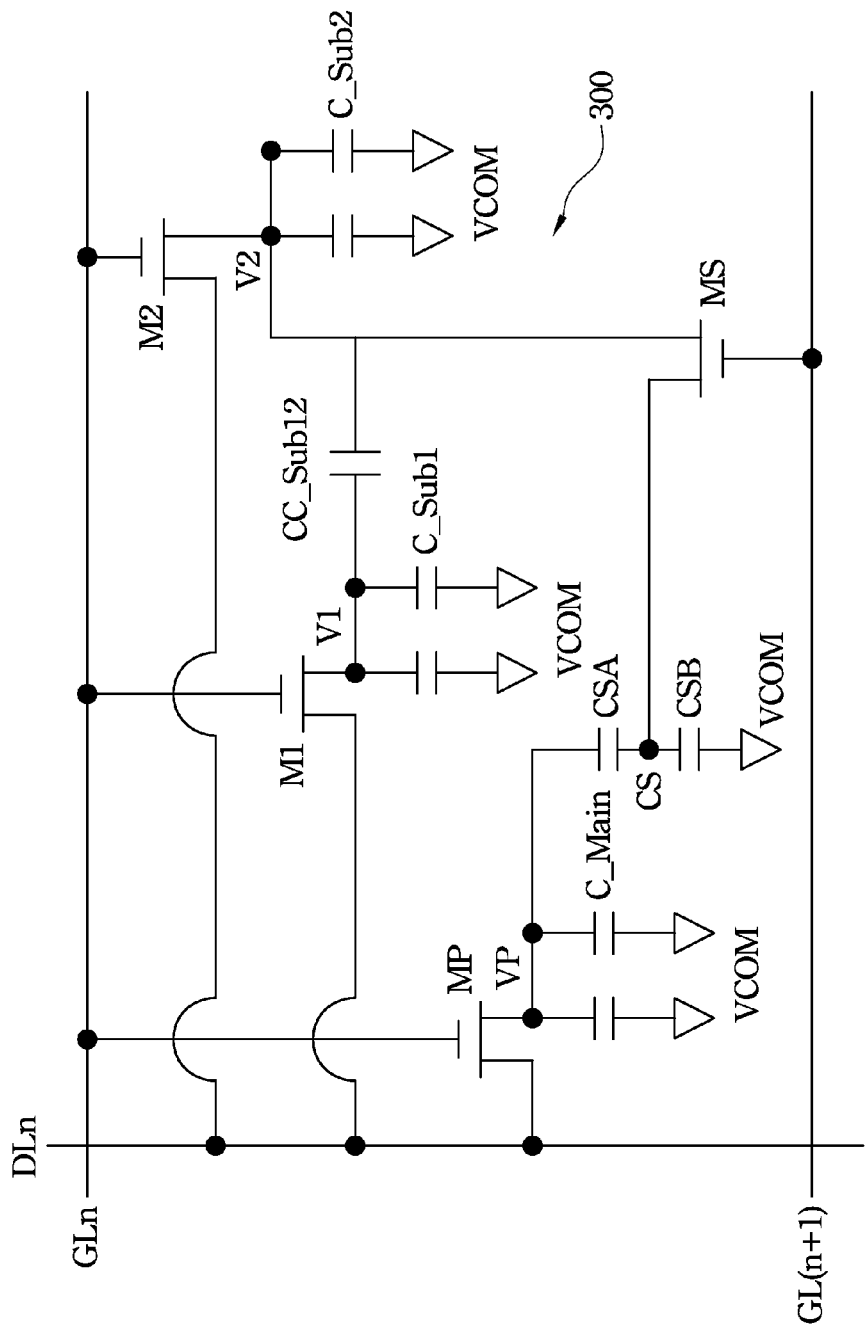
FIG. 4 is a diagram illustrating an equivalent circuit of the sub-pixel shown in FIG. 3 according to one embodiment of the present invention.

FIG. 4 is a diagram illustrating an equivalent circuit of the sub-pixel shown in FIG. 3 according to one embodiment of the present invention. Referring to FIG. 3 and FIG. 4, the sub-pixel 300 includes switches MP, M1, M2 and MS, storage capacitors C_Main, C_Sub1, C_Sub2, a coupling capacitor CC_Sub12, and a charge-sharing capacitor CSA. In practice, the switches MP, M1, M2 and MS can be implemented by thin-film transistors (TFT).

For the first display region Main, the switch MP is electrically connected between the data line DLn and a sub-pixel electrode (hereinafter denoted by VP), and a control end of the switch MP is electrically connected to the scan line GLn. The storage capacitor C_Main is electrically connected between the sub-pixel electrode VP and a common electrode VCOM (configured to have a common voltage) such that when the switch MP is activated, and the data signal on the data line DLn is transmitted to the storage capacitor C_Main through the switch MP, and the storage capacitor C_Main is charged according to the data signal to store the corresponding voltage. The sub-pixel electrode VP accordingly has a corresponding potential, and the first display region Main therefore displays the image.

For the second display region Sub1, the switch M1 is electrically connected between the data line DLn and a sub-pixel electrode (hereinafter denoted by V1), and a control end of the switch M1 is electrically connected to the scan line GLn. The storage capacitor C_Sub1 is electrically connected between the sub-pixel electrode V1 and the common electrode VCOM, such that when the switch M1 is activated, and the data signal on the data line DLn is transmitted to the storage capacitor C_Sub1 through the switch M1, and the storage capacitor C_Sub1 is charged according to the data signal to store the corresponding voltage. The sub-pixel electrode V1 accordingly has a corresponding potential, and the second display region Sub1 therefore displays the image.

Similarly, for the third display region Sub2, the switch M2 is electrically connected between the data line DLn and a sub-pixel electrode (hereinafter denoted by V2), and a control end of the switch M2 is electrically connected to the scan line GLn. The storage capacitor C_Sub2 is electrically connected between the sub-pixel electrode V2 and the common electrode VCOM, such that when the switch M2 is activated, the data signal on the data line DLn is transmitted to the storage capacitor $C_{13}$ Sub2 through the switch M2, and the storage capacitor C_Sub2 is charged according to the data signal to store the corresponding voltage. The sub-pixel electrode V2 accordingly has a corresponding potential, and the third display region Sub2 therefore displays the image.

It is noted that the potential of each of the sub-pixel electrodes VP, V1 and V2 mentioned above or below may mean the potential of the sub-pixel electrode itself and also may generally be referred to as the voltage difference between the sub-pixel electrode itself and the common electrode VCOM, which is well known by persons of ordinary skill in the art, and the present invention is not literally limited thereto. However, no matter what it means, the potential (or voltage) differences between the sub-pixel electrodes VP, V1 and V2 mentioned below are obtained by comparing the potentials (or voltages) thereof based on the same connotation.

In addition, the coupling capacitor $CC_{13}$ Sub12 is electrically connected to the second display region Sub1 and the third display region Sub2, so as to couple the potentials of the second display region Sub1 and the third display region Sub2. In the present embodiment, the coupling capacitor $CC_{13}$ Sub12 is electrically connected between the sub-pixel electrode V1 and the sub-pixel electrode V2, so as to pull down the potential of one of the sub-pixel electrode V1 and the sub-pixel electrode V2 when the potential of the other is decreased, or to pull up the potential of one of the sub-pixel electrode V1 and the sub-pixel electrode V2 when the potential of the other is increased. For example, when the potential of the sub-pixel electrode V2 is decreased, the potential of the sub-pixel electrode V1 may be pulled down to a relatively low potential via the coupling capacitor $CC_{13}$ Sub12.

In one embodiment, as shown in FIG. 3, the coupling capacitor $CC_{13}$ Sub12 can be disposed in parallel with the data lines DLn and DL(n+1) along a column direction. In another embodiment, the coupling capacitor $CC_{13}$ Sub12 can be disposed in perpendicular to the data lines DLn and DL(n+1) along a row direction (e.g., the direction in parallel with the common electrode VCOM), and in this condition, the coupling capacitor $CC_{13}$ Sub12 can further be embedded or hidden in the common electrode VCOM in the display regions Main, Sub1 or Sub2, so as to improve the aperture ratio of the sub-pixel 300, such that a layout of the pixel becomes better.

Moreover, the charge-sharing capacitor CSA is electrically connected between the sub-pixel electrode VP and the switch MS. The switch MS is electrically connected to one end of the charge-sharing capacitor CSA and one end of the coupling capacitor $CC_{13}$ Sub12, and a control end of the switch MS is electrically connected to the scan line GL(n+1), such that the first display region Main is electrically connected to the third display region Sub2 through the charge-sharing capacitor CSA and the switch MS.

In one embodiment, the sub-pixel 300 can further include another charge-sharing capacitor CSB, in which one end of the charge-sharing capacitor CSB is electrically connected to one end of the charge-sharing capacitor CSA at a node CS, and the other end of the charge-sharing capacitor CSB is electrically connected to the common electrode VCOM.

Figure 5:
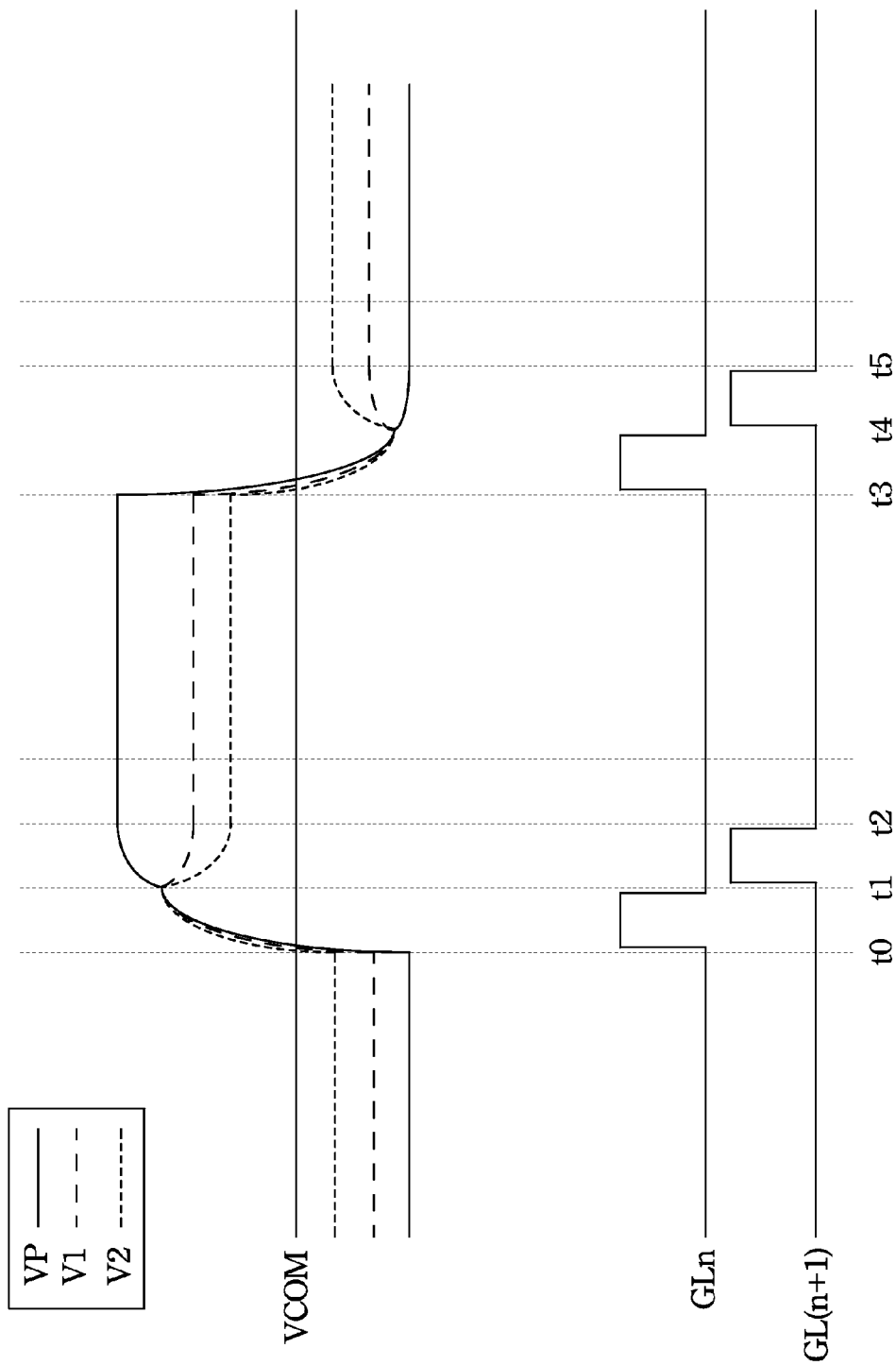
FIG. 5 is a diagram illustrating potential variations of the sub-pixel electrodes when the equivalent circuit of the sub-pixel shown in FIG. 4 is operated, according to one embodiment of the present invention.

The operation of the sub-pixel 300 mentioned above will be described below in conjunction with one embodiment. FIG. 5 is a diagram illustrating potential variations of the sub-pixel electrodes when the equivalent circuit of the sub-pixel shown in FIG. 4 is operated according to one embodiment of the present invention. FIG. 5 is merely illustrative and not restrictive of the present invention; in other words, the potential variations of the sub-pixel electrodes VP, V1 and V2 can be adjusted according to practical needs within the spirit and scope of the appended claims. The potential variations of the sub-pixel electrodes VP, V1 and V2 also may be generally referred to as the potential variations of the first display region Main, the second display region Sub1, and the third display region Sub2.

Referring to FIG. 4 and FIG. 5, for the present embodiment, in a positive half period (i.e., a positive polarity inversion period of a polarity inversion period, and the potential of the data signal is greater than the potential of the common electrode VCOM), when the scan line GLn transmits the scan signal during the time between t0 and t1, the switches MP, M1 and M2 are activated (or turned on) according to the scan signal on the scan line GLn, such that the data signal on the data line DLn is transmitted to the storage capacitors C_Main, $C_{13}$ Sub1 and $C_{13}$ Sub2 respectively through the switches MP, M1 and M2, and the storage capacitors $C_{13}$ Main, $C_{13}$ Sub1 and $C_{13}$ Sub2 are charged according to the data signal on the data line DLn to store the corresponding voltages, resulting in that the sub-pixel electrodes VP, V1 and V2 accordingly have the corresponding potentials.

Thereafter, when the scan line GL(n+1) transmits the scan signal during the time between t1 and t2, the switches MP, M1 and M2 are deactivated (or turned off) and the switch MS is activated, such that the potential of the sub-pixel electrode V2 is decreased via the charge-sharing capacitors CSA and CSB; in other words, a portion of charges in the storage capacitor $C_{13}$ Sub2 moves to the charge-sharing capacitors CSA and CSB through the switch MS such that the potential of the sub-pixel electrode VP is increased via the charge-sharing capacitor CSA. At that moment, since the potential of the sub-pixel electrode V2 is decreased, the potential of the sub-pixel electrode V1 is affected by the decrease of the potential of the sub-pixel electrode V2 and is also pulled down to a potential lower than the potential in the previous period (i.e., the potential in the period between t0 and t1) via the coupling capacitor $CC_{13}$ Sub12.

On the contrary, in a negative half period (i.e., a negative polarity inversion period of the polarity inversion period, and the potential of the data signal is smaller than the potential of the common electrode VCOM), when the scan line GLn transmits the scan signal during the time between t3 and t4, the switches MP, M1 and M2 are activated (or turned on) according to the scan signal on the scan line GLn, such that the data signal on the data line DLn is transmitted to the storage capacitors $C_{13}$ Main, $C_{13}$ Sub1 and C_Sub2 respectively through the switches MP, M1 and M2, and the storage capacitors $C_{13}$ Main, $C_{13}$ Sub1 and C_Sub2 are charged according to the data signal on the data line DLn to store the corresponding voltages, resulting in that the sub-pixel electrodes VP, V1 and V2 accordingly have the corresponding potentials.

Thereafter, when the scan line GL(n+1) transmits the scan signal during the time between t4 and t5, the switches MP, M1, M2 are deactivated (or turned off) and the switch MS is activated, such that the potential of the sub-pixel electrode V2 is increased via the charge-sharing capacitors CSA and CSB;

in other words, a portion of charges in the charge-sharing capacitors CSA and CSB moves to the storage capacitor C_Sub2 through the switch MS such that the potential of the sub-pixel electrode VP is decreased via the charge-sharing capacitor CSA. At that moment, since the potential of the sub-pixel electrode V2 is increased, the potential of the sub-pixel electrode V1 is affected by the increase of the potential of the sub-pixel electrode V2 and is also pulled up to a potential higher than the potential in the previous period (i.e., the potential in the period between t3 and t4) via the coupling capacitor $CC_{13}$ Sub12.

As a result, for the operation of the positive polarity inversion or the negative polarity inversion, i.e., the data signal in the positive half period or the negative half period, the first display region Main, the second display region Sub1, and the third display region Sub2 can have significant potential differences therebetween, such that the images displayed by different display regions can be significantly distinguished.

As known above, by pulling down (or pulling up) the potentials of the sub-pixel electrodes V1, V2 together and correspondingly pulling up (or pulling down) the potential of the sub-pixel electrode VP, the potentials of the sub-pixel electrodes VP, V1, V2 therefore can have distinct differences therebetween, such that the images displayed by the first display region Main, the second display region Sub1 and the third display region Sub2 can also have distinct differences therebetween, so as to effectively solve the problem that the display has color shift or color washout.

Figure 6:
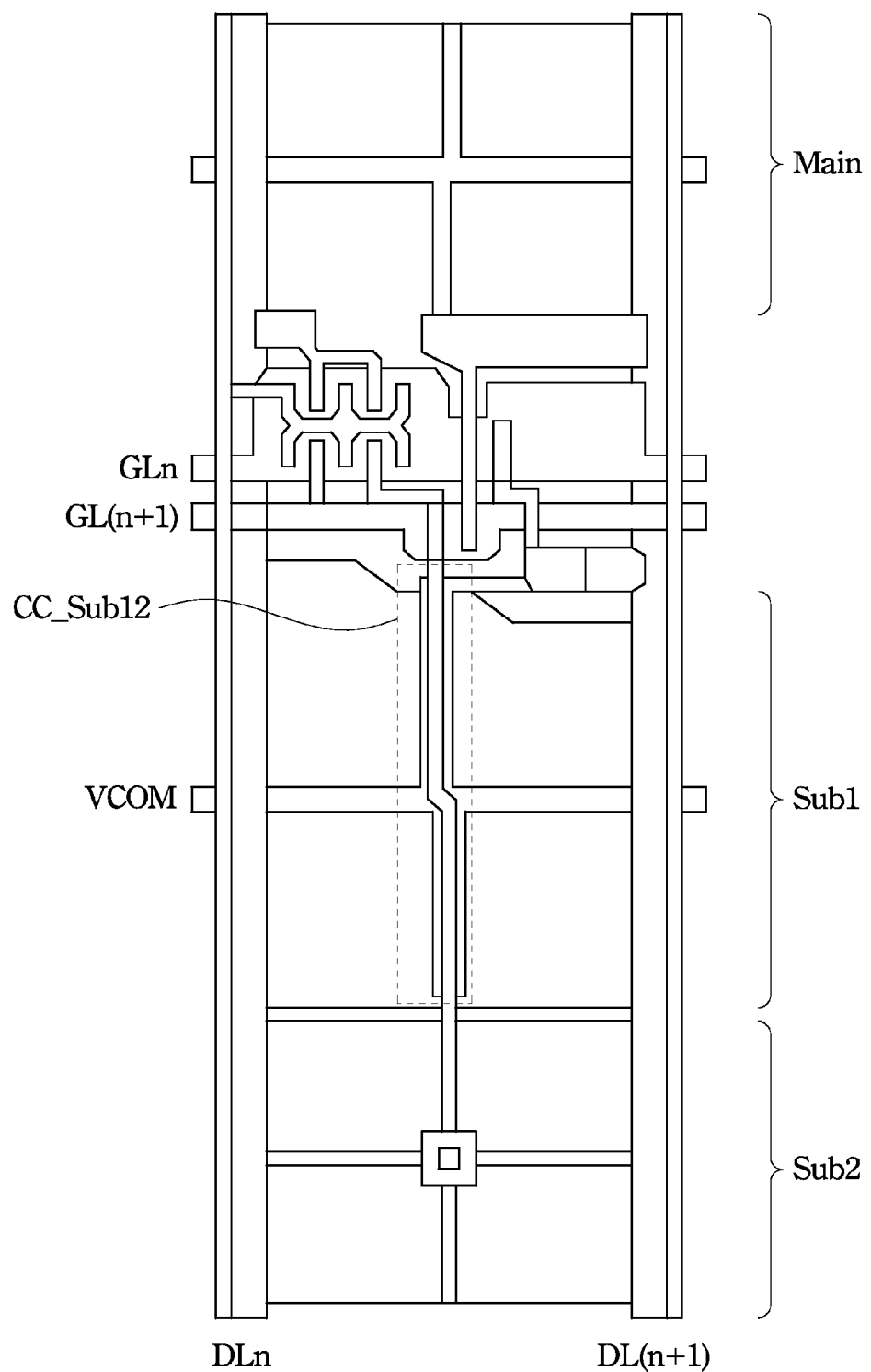
FIG. 6 is a diagram illustrating a sub-pixel according to another embodiment of the present invention.

FIG. 6 is a diagram illustrating a sub-pixel according to another embodiment of the present invention. The sub-pixel 600 is applicable to the pixel 200 shown in FIG. 2. As shown in FIG. 6, the sub-pixel 600 includes the first display region Main, the second display region Sub1, and the third display region Sub2, in which each display region also has multiple domains. The first display region Main, the second display region Sub1 and the third display region Sub2 are configured to receive the data signal on the same data line (e.g., the data line DLn) to have potentials respectively, so as to display corresponding images separately.

In one embodiment, as shown in FIG. 6, the coupling capacitor $CC_{13}$ Sub12 can be disposed in parallel with the data lines DLn, DL(n+1) along a column direction. In another embodiment, the coupling capacitor $CC_{13}$ Sub12 can be disposed in perpendicular to the data lines DLn, DL(n+1) along a row direction (e.g., the direction in parallel with the common electrode VCOM), and in this condition, the coupling capacitor $CC_{13}$ Sub12 can further be embedded or hidden in the common electrode VCOM in the display regions Main, Sub1 or Sub2, so as to improve the aperture ratio of the sub-pixel 600, such that a layout of the pixel becomes better.

Figure 7:
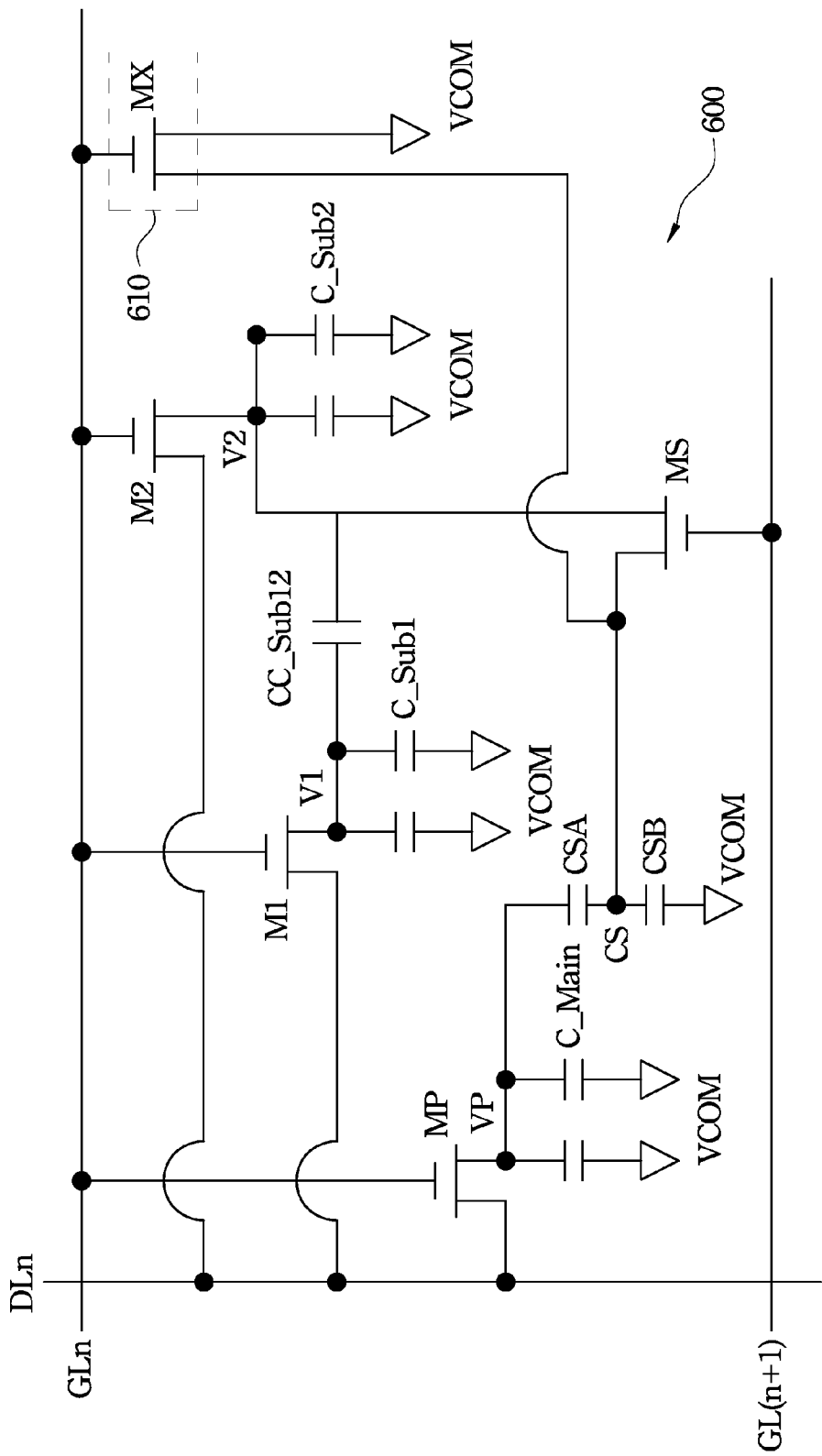
FIG. 7 is a diagram illustrating an equivalent circuit of the sub-pixel shown in FIG. 6 according to one embodiment of the present invention.

FIG. 7 is a diagram illustrating an equivalent circuit of the sub-pixel shown in FIG. 6 according to one embodiment of the present invention. Referring to FIG. 6 and FIG. 7, the sub-pixel 600 includes the switches MP, M1, M2 and MS, the storage capacitors $C_{13}$ Main, $C_{13}$ Sub1 and $C_{13}$ Sub2, the coupling capacitor $CC_{13}$ Sub12, and the charge-sharing capacitor CSA. In practice, the switches MP, M1, M2, MS can be implemented by thin-film transistors (TFT).

As mentioned above, for the first display region Main, the switch MP is electrically connected between the data line DLn and the sub-pixel electrode VP, and the control end of the switch MP is electrically connected to the scan line GLn. The storage capacitor C_Main is electrically connected between the sub-pixel electrode VP and the common electrode VCOM configured to provide the common voltage, such that when the switch MP is activated, the data signal on the data line DLn is transmitted to the storage capacitor C_Main through the switch MP, and the storage capacitor C_Main is charged according to the data signal to store the corresponding voltage. The sub-pixel electrode VP accordingly has the corresponding potential, and the first display region Main therefore displays the image.

For the second display region Sub1, the switch M1 is electrically connected between the data line DLn and the sub-pixel electrode V1, and the control end of the switch M1 is electrically connected to the scan line GLn. The storage capacitor $C_{13}$ Sub1 is electrically connected between the sub-pixel electrode V1 and the common electrode VCOM, such that when the switch M1 is activated, the data signal on the data line DLn is transmitted to the storage capacitor $C_{13}$ Sub1 through the switch Ml, and the storage capacitor $C_{13}$ Sub1 is charged according to the data signal to store the corresponding voltage. The sub-pixel electrode V1 accordingly has the corresponding potential, and the second display region Sub1 therefore displays the image.

For the third display region Sub2, the switch M2 is electrically connected between the data line DLn and the sub-pixel electrode V2, and the control end of the switch M2 is electrically connected to the scan line GLn. The storage capacitor $C_{13}$ Sub2 is electrically connected between the sub-pixel electrode V2 and the common electrode VCOM, such that when the switch M2 is activated, and the data signal on the data line DLn is transmitted to the storage capacitor $C_{13}$ Sub2 through the switch M2, and the storage capacitor $C_{13}$ Sub2 is charged according to the data signal to store the corresponding voltage. The sub-pixel electrode V2 accordingly has the corresponding potential, and the third display region Sub2 therefore displays the image.

In addition, the coupling capacitor $CC_{13}$ Sub12 is electrically connected to the second display region Sub1 and the third display region Sub2, so as to couple the potentials of the second display region Sub1 and the third display region Sub2. In the present embodiment, the coupling capacitor $CC_{13}$ Sub12 is electrically connected between the sub-pixel electrode V1 and the sub-pixel electrode V2, so as to pull down the potential of one of the sub-pixel electrode V1 and the sub-pixel electrode V2 when the potential of the other of the sub-pixel electrode V1 and the sub-pixel electrode V2 is decreased, or to pull up the potential of one of the sub-pixel electrode V1 and the sub-pixel electrode V2 when the potential of the other of the sub-pixel electrode V1 and the sub-pixel electrode V2 is increased.

Moreover, one end of the charge-sharing capacitor CSA is electrically connected to the sub-pixel electrode VP, and the other end of the charge-sharing capacitor CSA is electrically connected to the switch MS and electrically connected to the sub-pixel electrode V2 through the switch MS. The switch MS is electrically connected between one end of the charge-sharing capacitor CSA and one end of the coupling capacitor $CC_{13}$ Sub12, and the control end of the switch MS is electrically connected to the scan line GL(n+1), such that the first display region Main is electrically connected to the third display region Sub2 through the charge-sharing capacitor CSA and the switch MS. In one embodiment, the pixel 600 can further include another charge-sharing capacitor CSB, in which one end of the charge-sharing capacitor CSB is electrically connected to one end of the charge-sharing capacitor CSA at the node CS, and the other end of the charge-sharing capacitor CSB is electrically connected to the common electrode VCOM.

In addition, compared to the sub-pixel shown in FIG. 4, the sub-pixel 600 of the present embodiment further includes a switch unit 610, and one end of the charge-sharing capacitor CSA, i.e., node CS, is electrically connected to the common electrode VCOM through the switch unit 610. In one embodiment, the switch unit 610 further includes a transistor MX, in which the transistor MX has a gate electrode, a first source/drain electrode and a second source/drain electrode, and its gate electrode is electrically connected to the scan line GLn, and its first source/drain electrode is electrically connected to the common electrode VCOM, and its second source/drain electrode is electrically connected to one end of the charge-sharing capacitor CSA, i.e., the node CS.

In another embodiment, the charge-sharing capacitor CSB can have a capacitance that is far smaller than that of the charge-sharing capacitor CSA, or even approaches to 0, such that the related charge-sharing operation between the sub-pixel electrodes VP and V2 is performed by the charge-sharing capacitor CSA without the charge-sharing capacitor CSB, and such that when the potential of the third display region Sub2 is decreased, the decreased potential is substantially the same as the increased potential of the first display region Main.

Figure 8:
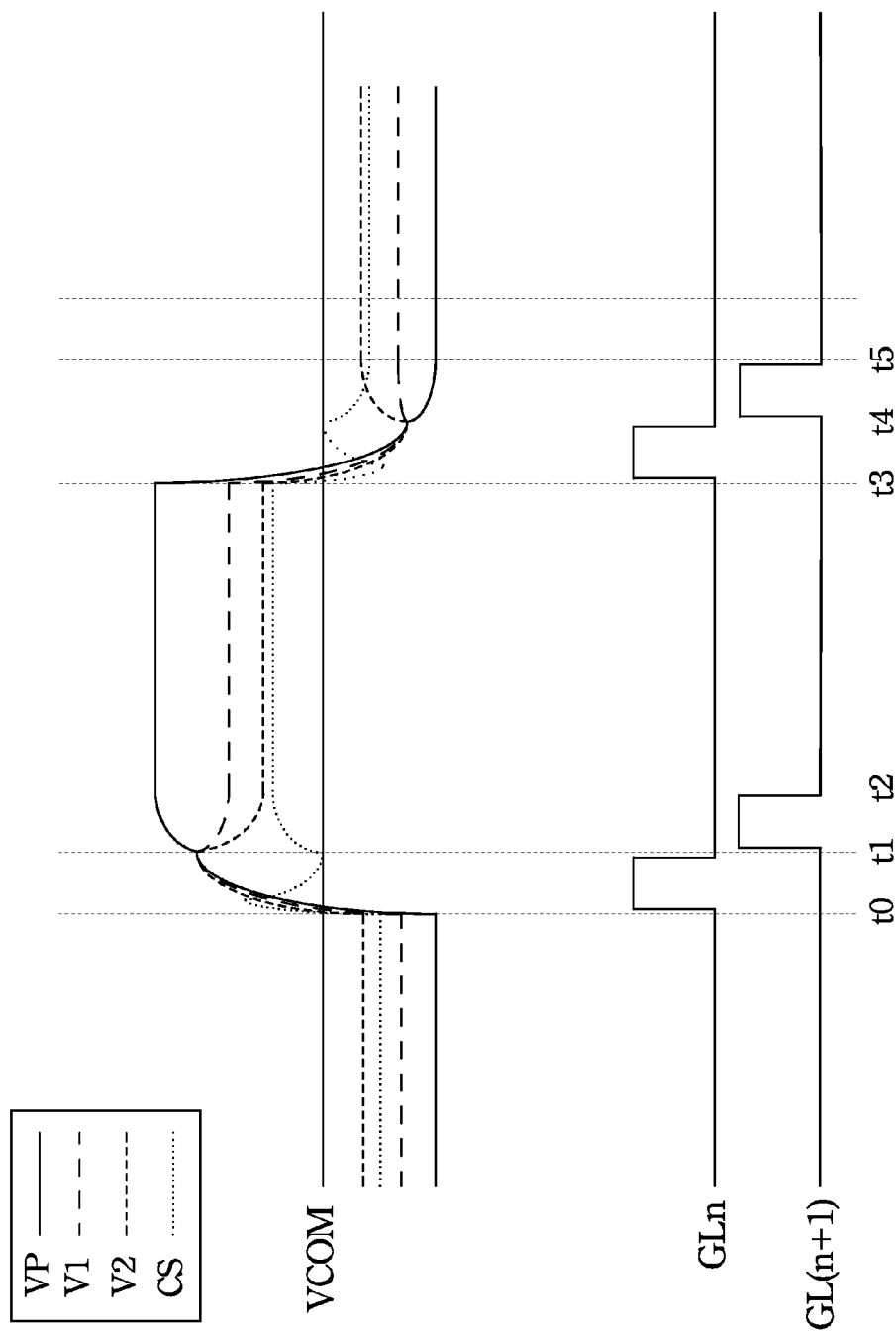
FIG. 8 is a diagram illustrating potential variations of the sub-pixel electrodes when the equivalent circuit of the sub-pixel shown in FIG. 7 is operated, according to one embodiment of the present invention.

The operation of the sub-pixel 600 mentioned above will be described below in conjunction with one embodiment. FIG. 8 is a diagram illustrating potential variations of the sub-pixel electrodes when the equivalent circuit of the sub-pixel shown in FIG. 7 is operated according to one embodiment of the present invention. FIG. 8 is merely illustrative and not restrictive of the present invention; in other words, the potential variations of the sub-pixel electrodes VP, V1, V2 can be adjusted according to practical needs within the spirit and scope of the appended claims. The potential variations of the sub-pixel electrodes VP, V1 and V2 shown in FIG. 8 also may be generally referred to as the potential variations of the first display region Main, the second display region Sub1, and the third display region Sub2.

Referring to FIG. 7 and FIG. 8, for the present embodiment, in the positive half period (i.e., the positive polarity inversion period of the polarity inversion period, and the potential of the data signal is greater than the potential of the common electrode VCOM), when the scan line GLn transmits the scan signal during the time between t0 and t1, the switches MP, M1 and M2 are activated (or turned on) according to the scan signal on the scan line GLn, such that the data signal on the data line DLn is transmitted to the storage capacitors $C_{13}$ Main, $C_{13}$ Sub1 and C_Sub2 respectively through the switches MP, M1 and M2, and the storage capacitors $C_{13}$ Main, $C_{13}$ Sub1 and C_Sub2 are charged according to the data signal on the data line DLn to store the corresponding voltages, such that the sub-pixel electrodes VP, V1 and V2 accordingly have the corresponding potentials. In addition, when the scan line GLn transmits the scan signal during the time between t0 and t1, the switch MX is also activated according to the scan signal on the scan line GLn, and thus the potential of the node CS is pulled down to the potential of the common electrode VCOM as well.

Thereafter, when the scan line GL(n+1) transmits the scan signal during the time between t1 and t2, the switches MP, M1 and M2 are deactivated (or turned off) and the switch MS is activated. At that moment, the potential of the node CS is pulled down to the potential of the common electrode VCOM and the potential difference between the node CS and the common electrode VCOM becomes large, such that the potential of the sub-pixel electrode V2 can be more easily decreased via the charge-sharing capacitors CSA and CSB; in other words, a portion of charges in the storage capacitor C_Sub2 can be moved more easily to the charge-sharing capacitors CSA and CSB through the switch MS, such that the potential of the sub-pixel electrode VP is increased via the charge-sharing capacitor CSA more efficiently. Moreover, since the potential of the sub-pixel electrode V2 is decreased, the potential of the sub-pixel electrode V1 is affected by the decrease of the potential of the sub-pixel electrode V2 and is also pulled down to a potential lower than the potential in the previous period (i.e., the potential in the period between t0 and t1) via the coupling capacitor $CC_{13}$ Sub12.

On the contrary, in the negative half period (i.e., the negative polarity inversion period of the polarity inversion period, and the potential of the data signal is smaller than the potential of the common electrode VCOM), when the scan line GLn transmits the scan signal during the time between t3 and t4, the switches MP, M1 and M2 are activated (or turned on) according to the scan signal on the scan line GLn, such that the data signal on the data line DLn is transmitted to the storage capacitors $C_{13}$ Main, $C_{13}$ Sub1 and C_Sub2 respectively through the switches MP, M1 and M2, and the storage capacitors $C_{13}$ Main, $C_{13}$ Sub1 and C_Sub2 are charged according to the data signal on the data line DLn to store the corresponding voltages, such that the sub-pixel electrodes VP, V1 and V2 accordingly have the corresponding potentials. In addition, when the scan line GLn transmits the scan signal during the time between t0 and t1, the switch MX is also activated according to the scan signal on the scan line GLn, and thus the potential of the node CS is pulled up to the potential of the common electrode VCOM as well.

Thereafter, when the scan line GL(n+1) transmits the scan signal during the time between t4 and t5, the switches MP, M1 and M2 are deactivated (or turned off) and the switch MS is activated. At that moment, the potential of the node CS is pulled up to the potential of the common electrode VCOM and the potential difference between the node CS and the common electrode VCOM becomes large, such that the potential of the sub-pixel electrode V2 can be more easily increased via the charge-sharing capacitors CSA and CSB; in other words, a part of charges in the charge-sharing capacitors CSA and CSB can be moved more easily to the storage capacitor $C_{13}$ Sub2 through the switch MS, such that the potential of the sub-pixel electrode VP is decreased via the charge-sharing capacitor CSA more efficiently. Moreover, since the potential of the sub-pixel electrode V2 is increased, the potential of the sub-pixel electrode V1 is affected by the increase of the potential of the sub-pixel electrode V2 and is also pulled up to a potential higher than the potential in the previous period (i.e., the potential in the period between t3 and t4) via the coupling capacitor $CC_{13}$ Sub12.

As a result, for the operation of the positive polarity inversion or the negative polarity inversion, i.e., the data signal in the positive half period or the negative half period, compared to FIG. 4, in addition to pulling down (or pulling up) the potentials of the sub-pixel electrodes V1 and V2 together, the potential of the sub-pixel electrode VP in the present embodiment can further be correspondingly pulled up (or pulled down), such that the first display region Main, the second display region Sub1, and the third display region Sub2 can have significant potential differences therebetween, and the images displayed by different display regions can be significantly distinguished.

Figure 9:
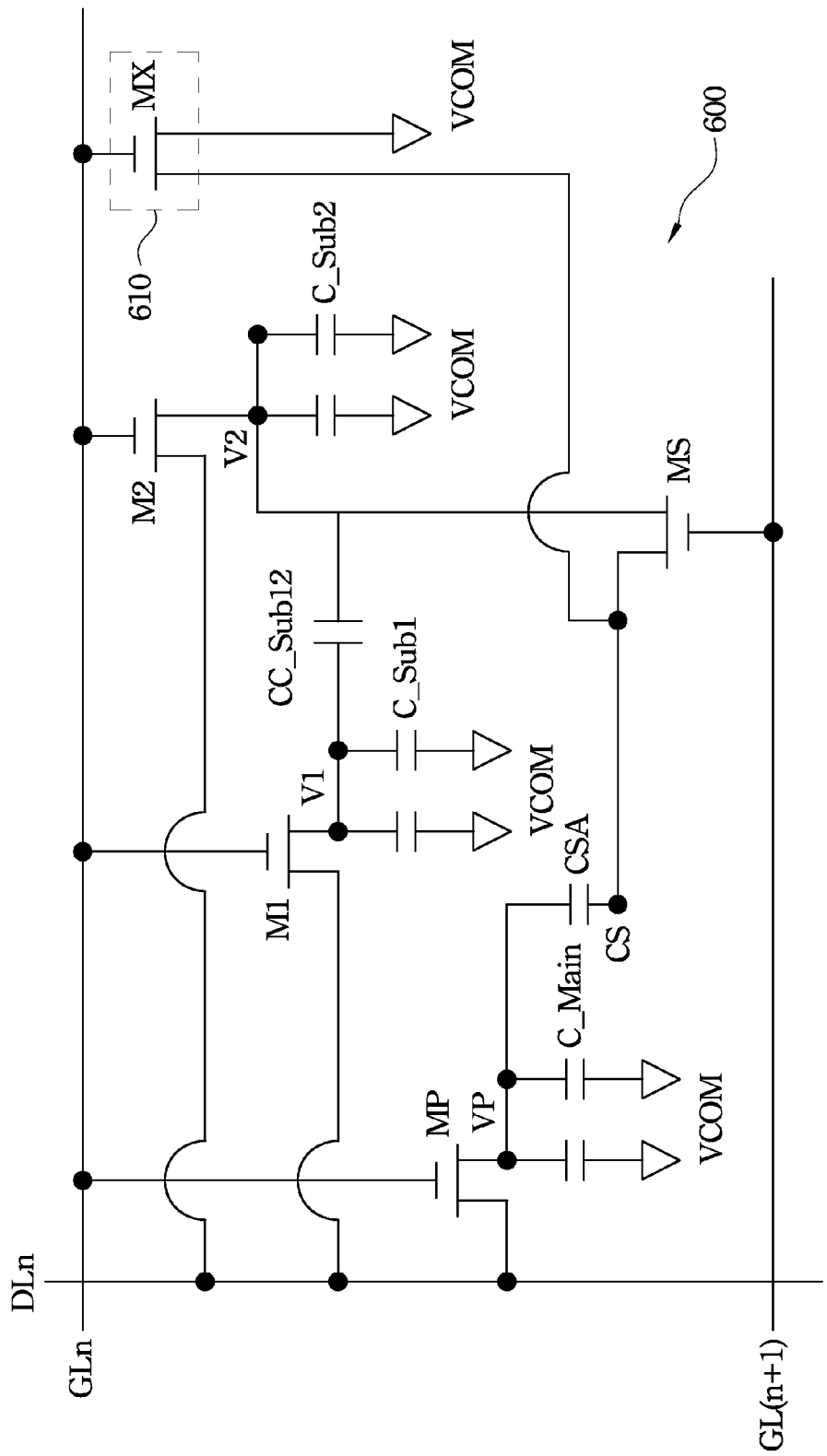
FIG. 9 is a diagram illustrating a sub-pixel according to still another embodiment of the present invention.

FIG. 9 is a diagram illustrating a sub-pixel according to still another embodiment of the present invention. The sub-pixel 900 is applicable to the pixel 200 shown in FIG. 2. Compared to the sub-pixel 600 shown in FIG. 7, in the sub-pixel 900 of the present embodiment, there is no capacitor (e.g., no capacitor CSB) between the charge-sharing capacitor CSA and the common electrode VCOM. In another embodiment, the capacitor CSB having a potential that is far smaller than the potential of the capacitor CSA and approaches to 0, can be disposed between the charge-sharing capacitor CSA and the common electrode VCOM.

The operation of the sub-pixel 900 in the present embodiment is similar to that of the sub-pixel 600 shown in FIG. 7, and thus it will not be described in further detail. However, compared to the operation of the sub-pixel 600 shown in FIG. 7, in the present embodiment, when the switch MS is activated, the potential of the sub-pixel electrode V2 is decreased via the charge-sharing capacitor CSA, and the potential of one end of the charge-sharing capacitor CSA, i.e., the node CS, which is connected to the switch MS, is correspondingly increased; in other words, the entire charges moving from the storage capacitor $C_{13}$ Sub2 toward the node CS can almost transfer into the charge-sharing capacitor CSA, such that the decreased potential of the third display region Sub2 is substantially the same as the increased potential of the first display region Main.

As mentioned above, in addition to pulling down (or pulling up) the potentials of the sub-pixel electrodes V1 and V2 together via the coupling capacitor $CC_{13}$ Sub12, compared to the embodiment shown in FIG. 4, the potential of the sub-pixel electrode VP in the present embodiment can further be correspondingly pulled up (or pulled down), such that the first display region Main, the second display region Sub1, and the third display region Sub2 can have significant potential differences therebetween, and the images displayed by different display regions can be significantly distinguished.

Another aspect of the present invention is to provide a driving method in a display panel, in which the display panel includes a plurality of data lines (e.g., the data lines 212, 222, 232 and 242 shown in FIG. 2), a plurality of scan lines (e.g., the scan lines 214 and 224 shown in FIG. 2) and a plurality of sub-pixels (e.g., the sub-pixels 210, 220 and 230 shown in FIG. 2). The scan lines cross the data lines to define a plurality of sub-pixel regions (e.g., the sub-pixel regions 205 shown in FIG. 2), and the sub-pixels are disposed in the sub-pixel regions. Each of the sub-pixels includes a first sub-pixel electrode (e.g., the sub-pixel electrode VP shown in FIG. 7), a second sub-pixel electrode (e.g., the sub-pixel electrode V1 shown in FIG. 7), a third sub-pixel electrode (e.g., the sub-pixel electrode V2 shown in FIG. 7), a coupling capacitor (e.g., the capacitor $CC_{13}$ Sub12 shown in FIG. 7) and a charge-sharing capacitor (e.g., the capacitor CSA shown in FIG. 7). The coupling capacitor is electrically connected between the second sub-pixel electrode and the third sub-pixel electrode, and the first charge-sharing capacitor is electrically connected between the first sub-pixel electrode and the third sub-pixel electrode.

For clear description, the following embodiment related to the driving method is described in conjunction with, for example, the sub-pixel 600 shown in FIG. 7. However, the driving method is not limited to being applied in the embodiment shown in FIG. 7.

For the present embodiment, the driving method includes the following steps. In one step, a data signal is transmitted through the same data line DLn to the sub-pixel electrodes VP, V1 and V2. In another step, in a positive half period (i.e., a positive polarity inversion period of a polarity inversion period, and the potential of the data signal is greater than the potential of the common electrode VCOM), and the potential of the sub-pixel electrode V2 is pulled down and the potential of the sub-pixel electrode VP is pulled up via the charge-sharing capacitor CSA. In still another step, in the positive half period, when the potential of the sub-pixel electrode V2 is pulled down, the potential of the sub-pixel electrode V1 is pulled down via the coupling capacitor $CC_{13}$ Sub12, such that the potentials of the sub-pixel electrodes V1 and V2 are pulled down together, and the potential of the sub-pixel electrode VP is correspondingly pulled up.

In another embodiment, the driving method may further include the following steps. Before the potential of the sub-pixel electrode V2 is pulled down in the positive half period, the potential of one end (i.e., the node CS) of the charge-sharing capacitor CSA, which is connected to the sub-pixel electrode V2, is pulled down to a common potential (i.e., the potential of the common electrode VCOM), such that the potential of the node CS can be pulled down to a potential lower than the potential of the sub-pixel electrode V2.

In yet another embodiment, the driving method may further include the following steps. In a negative half period (i.e., a negative polarity inversion period of the polarity inversion period, and the potential of the data signal is smaller than the potential of the common electrode VCOM), the potential of the sub-pixel electrode V2 is pulled up and the potential of the sub-pixel electrode VP is pulled down via the charge-sharing capacitor CSA, and when the potential of the sub-pixel electrode V2 is pulled up, the potential of the sub-pixel electrode V1 is pulled up via the coupling capacitor $CC_{13}$ Sub12.

In addition, the driving method may further include the following steps. Before the potential of the sub-pixel electrode V2 is pulled down in the positive half period, the potential of one end (i.e., the node CS) of the charge-sharing capacitor CSA, which is connected to the sub-pixel electrode V2, is pulled down to the common potential (i.e., the potential of the common electrode VCOM), and before the potential of the sub-pixel electrode V2 is pulled up in the negative half period, the potential of one end (i.e., the node CS) of the charge-sharing capacitor CSA, which is connected to the sub-pixel electrode V2, is pulled up to the common potential.

As shown in FIG. 7, the sub-pixel 600 further includes the charge-sharing capacitor CSB, and thus in the other embodiment, the driving method may further include the following steps. In the positive half period, the potential of the sub-pixel electrode V2 is pulled down via the charge-sharing capacitor CSA and the charge-sharing capacitor CSB, and in the negative half period, the potential of the sub-pixel electrode V2 is pulled up via the charge-sharing capacitor CSA and the charge-sharing capacitor CSB.

On the other hand, as shown in FIG. 9, when, there is no capacitor (e.g., no capacitor CSB) between the charge-sharing capacitor CSA and the common electrode VCOM, the pulled down potential of the sub-pixel electrode V2 is substantially the same as the pulled up potential of the sub-pixel electrode VP.

It is noted that the steps are not necessarily recited in the sequence in which the steps are performed. That is, unless the sequence of the steps is expressly indicated, the sequence of the steps is interchangeable, and all or part of the steps may be simultaneously, partially simultaneously, or sequentially performed.

In conclusion, for the display panel, the pixel therein, and the driving method in the display panel, by pulling down (or pulling up) the potentials of two display regions in the sub-pixel together and correspondingly pulling up (or pulling down) the potential of one display region in the sub-pixel, the potentials of the display regions can have significant differences therebetween, and the relationship between the gray level and the transmissivity also can be formed to conform with the ideal Gamma curve, such that the multi-domain vertical alignment liquid crystal display with wide viewing angles is not apt to have issues such as color shift or color washout.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A pixel comprising:
a plurality of sub-pixels, each of the sub-pixels comprising:
   a first display region, comprising a first switch;
   a second display region, comprising a second switch;
   a third display region, comprising a third switch, wherein the first display region, the second display region and the third display region are configured to receive a data signal on a same data line to have corresponding potentials, respectively through the first switch, the second switch or the third switch, the first switch, the second switch and the third switch are configured to be activated in response to a first scan signal;
   a first capacitor electrically connected to the second display region and the third display region, and the first capacitor being connected between the second switch and the third switch, one end of the second switch is connected to one end of the first capacitor, and another end of the second switch is connected to the data line, one end of the third switch is connected to another end of the first capacitor, and another end of the third switch is connected to the data line; and
   a second capacitor electrically connected to the first display region and the third display region through a switch, wherein the switch is configured to be activated in response to a second scan signal, one end of the switch is connected to one end of the second capacitor, and another end of the switch is connected to one end of the first capacitor and the third display region;
   wherein when the switch is activated, the potential of the third display region is decreased via the second capacitor, the potential of the first display region is increased via the second capacitor, and the potential of the second display region is decreased via the first capacitor.

2. The pixel as claimed in claim 1, wherein each of the sub-pixels further comprises:
a switch unit, the second capacitor electrically connected to a common electrode through the switch unit.

3. The pixel as claimed in claim 2, wherein the switch unit further comprises:
a transistor having a gate electrode, a first source/drain electrode and a second source/drain electrode, wherein the gate electrode is electrically connected to a scan line, the first source/drain electrode is electrically connected to the common electrode, and the second source/drain electrode is electrically connected to the second capacitor.

4. The pixel as claimed in claim 1, wherein each of the sub-pixels further comprises:
a third capacitor electrically connected between the second capacitor and a common electrode.

5. The pixel as claimed in claim 1, wherein there is no capacitor between the second capacitor and a common electrode.

6. The pixel as claimed in claim 1, wherein when the switch is activated, the decreased potential of the third display region is substantially the same as the increased potential of the first display region.

7. A display panel, comprising:
a plurality of data lines;
a plurality of scan lines crossing the data lines to define a plurality of sub-pixel regions; and
a plurality of sub-pixels disposed in the sub-pixel regions, each of the sub-pixels comprising:
   a first sub-pixel electrode electrically connected to a data line of the data lines through a first switch;
   a second sub-pixel electrode electrically connected to the data line through a second switch;
   a third sub-pixel electrode electrically connected to the data line through a third switch;
   a coupling capacitor electrically connected between the second sub-pixel electrode and the third sub-pixel electrode, and the coupling capacitor being connected between the second switch and the third switch; and
   a first charge-sharing capacitor having a first end electrically connected to the first sub-pixel electrode, and a second end electrically connected to the third sub-pixel electrode through a fourth switch, one end of the fourth switch is electrically connected to one end of the first charge-sharing capacitor, and another end of the fourth switch is electrically connected to one end of the coupling capacitor and the third sub-pixel electrode,
wherein the fourth switch is electrically connected to a second scan line of the scan lines for receiving a second scan signal transmitted after the first scan signal so as to be activated, such that a potential of the third sub-pixel electrode is decreased, a potential at the second end of the first charge-sharing capacitor is increased, a potential of the first sub-pixel electrode is increased via the first charge-sharing capacitor, and a potential of the second sub-pixel electrode is decreased via the coupling capacitor.

8. The display panel as claimed in claim 7, wherein each of the sub-pixels further comprises:
a switch unit electrically connected to a first scan line of the scan lines to receive a first scan signal so as to be activated, wherein the second end of the first charge-sharing capacitor is electrically connected to a common electrode through the switch unit.

9. The display panel as claimed in claim 8, wherein the switch unit further comprises:
a transistor having a gate electrode, a first source/drain electrode and a second source/drain electrode, wherein the gate electrode is electrically connected to the first scan line, the first source/drain electrode is electrically connected to the common electrode, and the second source/drain electrode is electrically connected to the second end of the first charge-sharing capacitor.

10. The display panel as claimed in claim 8, wherein, when the fourth switch is activated, the decreased potential of the third sub-pixel electrode is substantially the same as the increased potential at the second end of the first charge-sharing capacitor.

11. The display panel as claimed in claim 7, wherein there is no capacitor between the first charge-sharing capacitor and a common electrode.

12. The display panel as claimed in claim 7, further comprising:

a second charge-sharing capacitor electrically connected between the first charge-sharing capacitor and a common electrode.

13. The display panel as claimed in claim 7, wherein the coupling capacitor is disposed in parallel with the data lines along a column direction or disposed in perpendicular to the data lines along a row direction.

14. A driving method in a display panel comprising a plurality of data lines, a plurality of scan lines and a plurality of sub-pixels, the scan lines crossing the data lines to define a plurality of sub-pixel regions in which the sub-pixels are disposed, each of the sub-pixels comprising a first sub-pixel electrode, a second sub-pixel electrode, a third sub-pixel electrode, a coupling capacitor and a first charge-sharing capacitor, wherein the coupling capacitor is electrically connected between the second sub-pixel electrode and the third sub-pixel electrode, and the first charge-sharing capacitor is electrically connected between the first sub-pixel electrode and the third sub-pixel electrode, the driving method comprising:
   transmitting a data signal through a same data line of the data lines to the first sub-pixel electrode, the second sub-pixel electrode and the third sub-pixel electrode;
   pulling down a potential of the third sub-pixel electrode and pulling up a potential of the first sub-pixel electrode via the first charge-sharing capacitor in a positive half period; and
   when the potential of the third sub-pixel electrode is pulled down in the positive half period, pulling down a potential of the second sub-pixel electrode via the coupling capacitor.

15. The driving method as claimed in claim 14, further comprising:
   before the potential of the third sub-pixel electrode is pulled down in the positive half period, pulling down a potential at one end of the first charge-sharing capacitor, which is connected to the third sub-pixel electrode, to a common potential.

16. The driving method as claimed in claim 14, wherein the pulled down potential of the third sub-pixel electrode is substantially the same as the pulled up potential of the first sub-pixel electrode.

17. The driving method as claimed in claim 14, further comprising:
   pulling up a potential of the third sub-pixel electrode and pulling down a potential of the first sub-pixel electrode via the first charge-sharing capacitor in a negative half period; and
   when the potential of the third sub-pixel electrode is pulled up in the negative half period, pulling up a potential of the second sub-pixel electrode via the coupling capacitor.

18. The driving method as claimed in claim 17, further comprising:
   before the potential of the third sub-pixel electrode is pulled down in the positive half period, pulling down a potential at one end of the first charge-sharing capacitor, which is connected to the third sub-pixel electrode, to a common potential; and
   before the potential of the third sub-pixel electrode is pulled up in the negative half period, pulling up the potential at the one end of the first charge-sharing capacitor, which is connected to the third sub-pixel electrode, to the common potential.

19. The driving method as claimed in claim 14, wherein each of the sub-pixels further comprises a second charge-sharing capacitor electrically connected between the first charge-sharing capacitor and a common electrode, and the driving method further comprises:
   pulling down a potential of the third sub-pixel electrode via the first charge-sharing capacitor and the second charge-sharing capacitor in the positive half period; and
   pulling up the potential of the third sub-pixel electrode via the first charge-sharing capacitor and the second charge-sharing capacitor in a negative half period.

* * * * *